(12) United States Patent
Tseng et al.

(10) Patent No.: US 7,773,683 B2
(45) Date of Patent: Aug. 10, 2010

(54) METHOD AND APPARATUS FOR ICI CANCELLATION IN COMMUNICATION SYSTEMS

(75) Inventors: Ming-Chien Tseng, Taipei (TW); Kun-Yi Lin, Taipei (TW); Chorng-Ren Sheu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 560 days.

(21) Appl. No.: 11/849,192

(22) Filed: Aug. 31, 2007

(65) Prior Publication Data

US 2009/0059781 A1   Mar. 5, 2009

(51) Int. Cl.
H04K 1/10 (2006.01)
(52) U.S. Cl. ............... 375/260; 375/354; 375/267; 375/346; 375/355; 370/208
(58) Field of Classification Search .......... 375/260, 375/354, 267, 346, 355; 370/208
See application file for complete search history.

(56) References Cited

U.S. PATENT DOCUMENTS

| | | | |
|---|---|---|---|
| 5,357,502 A | 10/1994 | Castelain et al. | |
| 7,551,548 B2 * | 6/2009 | Kasami et al. | 370/208 |
| 2004/0091057 A1 * | 5/2004 | Yoshida | 375/260 |
| 2004/0208269 A1 * | 10/2004 | Chen et al. | 375/354 |
| 2005/0105659 A1 * | 5/2005 | Sheu et al. | 375/360 |
| 2006/0239367 A1 | 10/2006 | Wilhelmsson et al. | |
| 2008/0159420 A1 * | 7/2008 | Tseng et al. | 375/260 |
| 2009/0274036 A1 * | 11/2009 | Lin et al. | 370/208 |

OTHER PUBLICATIONS

Huang et al.; A Novel Guard Interval Based ISI-Free Sampling Region Detection Method for OFDM Systems; pp. 515-519; IEEE 2004.*
Chang; A Novel Algorithm of Inter-Subchannel Interference Self-Cancellation for OFDM System; pp. 2881-2893; IEEE Transcations on Wireless Communications; vol. 6, No. 8; Aug. 2007.*
Yoshida et al.; Laboratory Experiment of OFDM Transmission Using VLP and pre-FFT Equalizer over ISI Channels; pp. 540-544; IEEE 2004.*

(Continued)

Primary Examiner—Sudhanshu C Pathak
(74) Attorney, Agent, or Firm—Alston & Bird LLP

(57) ABSTRACT

An apparatus capable of inter-carrier interference (ICI) cancellation in a communication system, the apparatus comprising a detecting module configured to detect an ISI-free region free from inter-symbol interference (ISI) in a guard interval (GI) of a symbol in time domain, a windowing module configured to provide a windowing function in time domain, identifying a weight value in the windowing function based on the ISI-free region, and multiplying a channel response related to the symbol by the windowing function in time domain to obtain a windowing result, wherein the windowing result comprises a first portion corresponding to the ISI-free region and a second region corresponding to an end portion of the symbol, the end portion and the ISI-free region having the same length, and a combination module configured to combine the first portion and the second portion of the windowing result in time domain.

26 Claims, 10 Drawing Sheets

OTHER PUBLICATIONS

Zhou et al.; An Improved Channel Estimator with Real-Time ISI Free Window Tracking for OFDM Systems; pp. 2416-2420; IEEE 2004.*

Beaulieu et al. "Receiver Windowing for Reduction of ICI in OFDM Systems with Carrier Frequency Offset," IEEE Globecom 2005.

Muschallik, Claus, "Improving an OFDM Reception Using an Adaptive Nyquist Windowing," IEEE Transactions on Consumer Electronics, vol. 42, No. 3, Aug. 1996.

* cited by examiner

METHOD AND APPARATUS FOR ICI CANCELLATION IN COMMUNICATION SYSTEMS

BACKGROUND OF THE INVENTION

The present invention generally relates to digital communications and, more specifically, to a method and apparatus for cancellation of inter-carrier interference (ICI) in a communication system such as an orthogonal frequency division multiplexing (OFDM) system.

In wireless communication, a signal may be converted into an electro-magnetic wave and transmitted through a physical channel such as air or other medium to a receiving end. Due to channel effects caused by multi-path reflection, diffraction or refraction, a received signal may suffer from interference. Moreover, a multi-path may become a frequency selective fading channel. For a single carrier modulation system, a receiver may be designed with a complicated time-domain equalizer so as to equalize the channel effect resulting from, for example, the multi-path reflection. However, in an OFDM system using multi-carrier modulation technology, by applying a guard interval (GI) in transmitting an OFDM symbol, the multi-path reflection channel effect may be significantly reduced. As a result, a receiver of the OFDM system may only need a simple equalizer such as a one-tap equalizer to equalize constructive interference or destructive interference from the channel. Therefore, OFDM has become an important technology in wired communications such as asymmetric digital subscriber line (ADSL) and power line communication (PLC) and in wireless communications such as wireless local area network (WLAN) based on the IEEE 802.11a/g/n standards, digital video broadcasting-terrestrial (DVB-T), digital video broadcasting-handheld (DVB-H) and digital audio broadcasting (DAB). Furthermore, the OFDM technology may also be applicable to the fourth generation (4G) personal mobile communications.

Some standards for the OFDM system, for example, the DVB-H and IEEE 802.16e standards, may require desirable reception performance of a receiver when moving at a relatively high speed. However, as a receiver is mobile with respected to a transmitter in an OFDM system, the channel impulse response during an OFDM symbol may not remain the same, which may result in a time-selective fading channel. Meanwhile, Doppler effect may occur, resulting in a frequency offset that is approximately one Doppler frequency ($f_c$) shift from the carrier frequency. Moreover, the frequency offset may be significant in an OFDM multi-carrier modulation system and cause an inter-carrier interference (ICI) effect, which in turn may deteriorate the orthogonality of OFDM signals and incur an "error floor" phenomenon.

FIG. 1 is a plot illustrating the error floor phenomenon. The plot may be made from the results of a simulation on the bit-error rate (BER) at various signal-to-noise power ratios (SNR) of a receiver in an OFDM system under the influence of ICI effect caused by Doppler effect, wherein the SNR in an multi-level quadrature amplitude modulation (M-QAM) modulation scheme can be defined as $\log_2 M \times E_b/N_O$ where $E_b/N_O$ is the ratio of the energy of one bit $E_b$ to the noise power spectrum density $N_O$. Referring to FIG. 1, a curve 102 represents a first condition near inter-carrier interference free (ICI-free), and curves 104 represent a second condition that the error floor phenomenon occurs, where the BER does not decrease as the SNR increases. By comparison, the BER on the curve 102 may decrease as the SNR increases and the smallest BER and largest SNR may be found on the curve 102. It may lead to a conclusion that the ICI effect caused by Doppler effect may deteriorate the performance of the OFDM receiver.

FIG. 2 is a diagram illustrating an OFDM sequence including OFDM symbols 202, 204 and 206 in an OFDM system. Referring to FIG. 2, in order to enhance the performance of the OFDM system and alleviate the multi-path reflection channel effect, a transmitter of the OFDM system may periodically duplicate a section 220 of the useful symbol 210 and prefix the duplicate, i.e., a guard interval 208, to the useful symbol 210 in time domain to form a complete OFDM symbol such as the OFDM symbol 202. The OFDM symbol 202 may therefore include the guard interval (GI) 208 with a length $T_g$ and the useful symbol 210 with a length $T_u$. When the guard interval 208 is longer than a maximum delay 214 with a length $\tau_{max}$ (i.e. $T_g > \tau_{max}$), an inter-symbol interference free region (ISI-free region) 212 may exist. The OFDM symbol 202 may then be transmitted into the channel. When the OFDM symbol 202 is received, the receiver may eliminate the inter-symbol interference due to the multi-path reflection channel effect by dropping the whole guard interval 208 directly. The useful symbol 210 may then be extracted and the influence caused by the channel may be compensated with a one-tap equalizer in order to estimate the data of the OFDM symbol 202.

In an environment wherein a receiver is moving at a relatively high speed, the length $\tau_{max}$ of the maximum delay 214 may be much shorter than the length $T_g$ of the guard interval 208. In some applications, for example, the length $T_g$ may be as long as a quarter (¼) of the length $T_u$ of the useful symbol 210. The ISI-free region 212 within the guard interval 208 may be used to reconstruct the transmitted signal and alleviate the ICI effect. Some prior art techniques have been proposed to alleviate the ICI effect based on the use of an ISI-free region. An example of the prior art techniques may be found in a paper, entitled "Improving an OFDM Reception Using an Adaptive Nyquist Windowing," by C. Muschallik, IEEE trans. Consumer Electron, vol. 42, no. 3, pp. 259-269 (hereinafter referred to as "the Muschallik"), Aug. 1996. Muschallik disclosed an OFDM receiver that employs a 2N-point FFT module. Another example of the prior art techniques may be found in a paper, entitled "Receiver Windowing for Reduction of ICI in OFDM Systems with Carrier Frequency Offset," by N. C. Beaulieu and P. Tan, 2005 IEEE Globecom proceedings, vol. 5, pp. 2680-2684, December 2005 (hereinafter referred to as "the Beaulieu"). Beaulieu and Tan also disclosed an OFDM receiver that employs a 2N-point FFT module. The above-mentioned 2N-point FFT modules may be more complicated and costly than an N-point FFT module. However, these OFDM receivers may not have achieved significant improvement in performance.

Still another example of the prior art techniques may be found in U.S. Pat. No. 5,357,502A to Castelain et al, entitled "Device for the Reception of Digital Data Time Frequency Interlacing, Notably for Radio Broadcasting at High Bit Rate towards Mobile Receivers with Nyquist Temporal Window" (hereinafter referred to as "the Castelain). Castelain disclosed a method of using a Nyquist temporal window for solving a time frequency interlacing problem. In Castelain, windowing coefficients may be obtained based on "Raised-Cosine Coefficients." The use of raised-cosine coefficients, as can be seen in Muschallik's design. Furthermore, U.S. Patent Application Publication No. 2006/0239367A1 by L. Wilhelmsson and M. Faulkner, entitled "Low Complexity Inter-Carrier Interference Cancellations" (hereinafter referred to as "the Wilhelmsson"), disclosed a method for reducing or eliminating the ICI effect. Although both the Castelain's and Wilhelmsson's methods may be simple because they need only an N-point FFT, windowing coefficients thus produced may not lead to a significant improvement in reducing or eliminating the ICI effect.

It may therefore be desirable to have a method and apparatus capable of forming windowing that may be less complicated and more cost efficient than the prior art techniques.

BRIEF SUMMARY OF THE INVENTION

Examples of the present invention may provide an apparatus capable of inter-carrier interference (ICI) cancellation in a communication system, the apparatus comprising a detecting module configured to detect an ISI-free region free from inter-symbol interference (ISI) in a guard interval (GI) of a symbol in time domain, a windowing module configured to provide a windowing function in time domain, identifying a weight value in the windowing function based on the ISI-free region, and multiplying a channel response related to the symbol by the windowing function in time domain to obtain a windowing result, wherein the windowing result comprises a first portion corresponding to the ISI-free region and a second region corresponding to an end portion of the symbol, the end portion and the ISI-free region having the same length, and a combination module configured to combine the first portion and the second portion of the windowing result in time domain.

Examples of the present invention may further provide an apparatus capable of inter-carrier interference (ICI) cancellation in a communication system, the apparatus comprising a detecting module configured to detect an ISI-free region free from inter-symbol interference (ISI) in a guard interval (GI) of a symbol in time domain, the symbol including an end portion having the same length as the ISI-free region, a windowing module configured to provide a windowing function in time domain, and multiplying a channel response related to the symbol by the windowing function in time domain to obtain a windowing result, wherein the windowing function includes a first linear section corresponding to the ISI-free region, a second linear region corresponding to the symbol except the GI and the end portion, and a third linear section corresponding to the end portion, and wherein the slope of the first linear section has an opposite sign number to the slope of the third linear section, and a combination module configured to sum a first portion of the windowing result into a second portion of the windowing result in time domain, wherein the first portion corresponds to the ISI-free region and the second region corresponds to the end portion of the symbol.

Some examples of the present invention may provide a method of cancelling inter-carrier interference (ICI) of a symbol, the method comprising detecting an ISI-free region free from inter-symbol interference (ISI) in a guard interval (GI) of the symbol in time domain, the symbol including an end portion having the same length as the ISI-free region, providing a windowing function in time domain, identifying a weight value in the windowing function based on the ISI-free region, multiplying a channel response related to the symbol by the windowing function in time domain to obtain a windowing result, wherein the windowing result comprises a first portion corresponding to the ISI-free region and a second region corresponding to the end portion of the symbol, and combining the first portion and the second portion of the windowing result in time domain.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
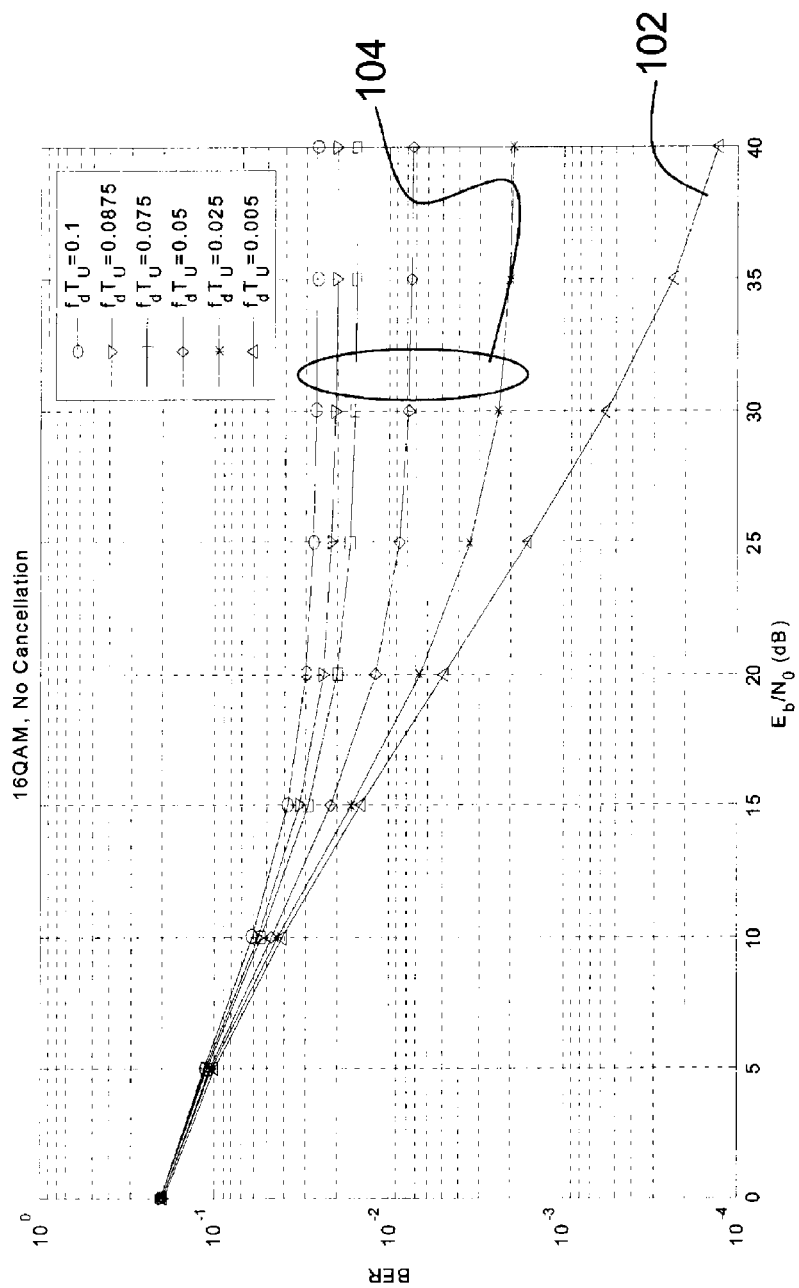
FIG. 1 is a plot illustrating an "error floor" phenomenon.
Figure 2:
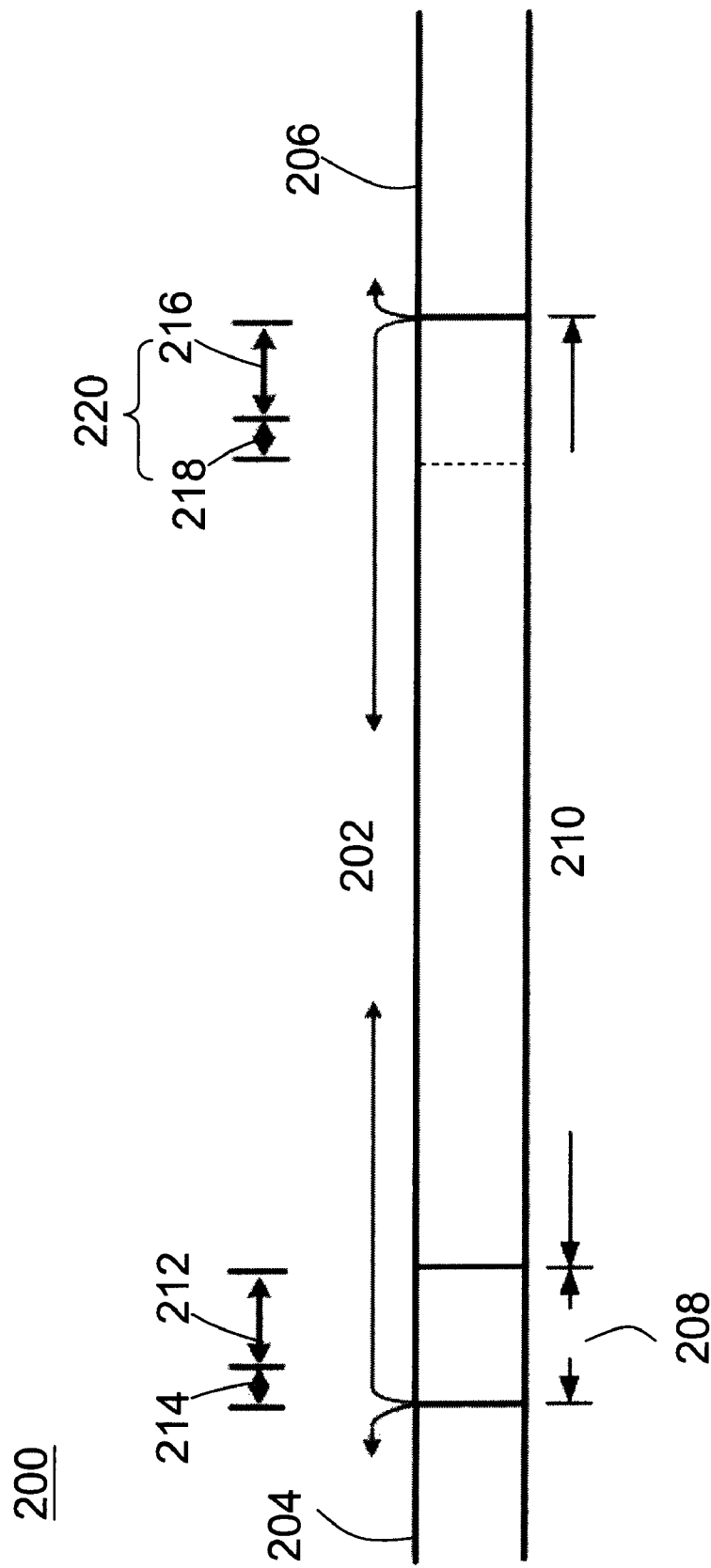
FIG. 2 is a diagram illustrating an orthogonal frequency division multiplexing (OFDM) sequence in an OFDM system.
Figure 3A:
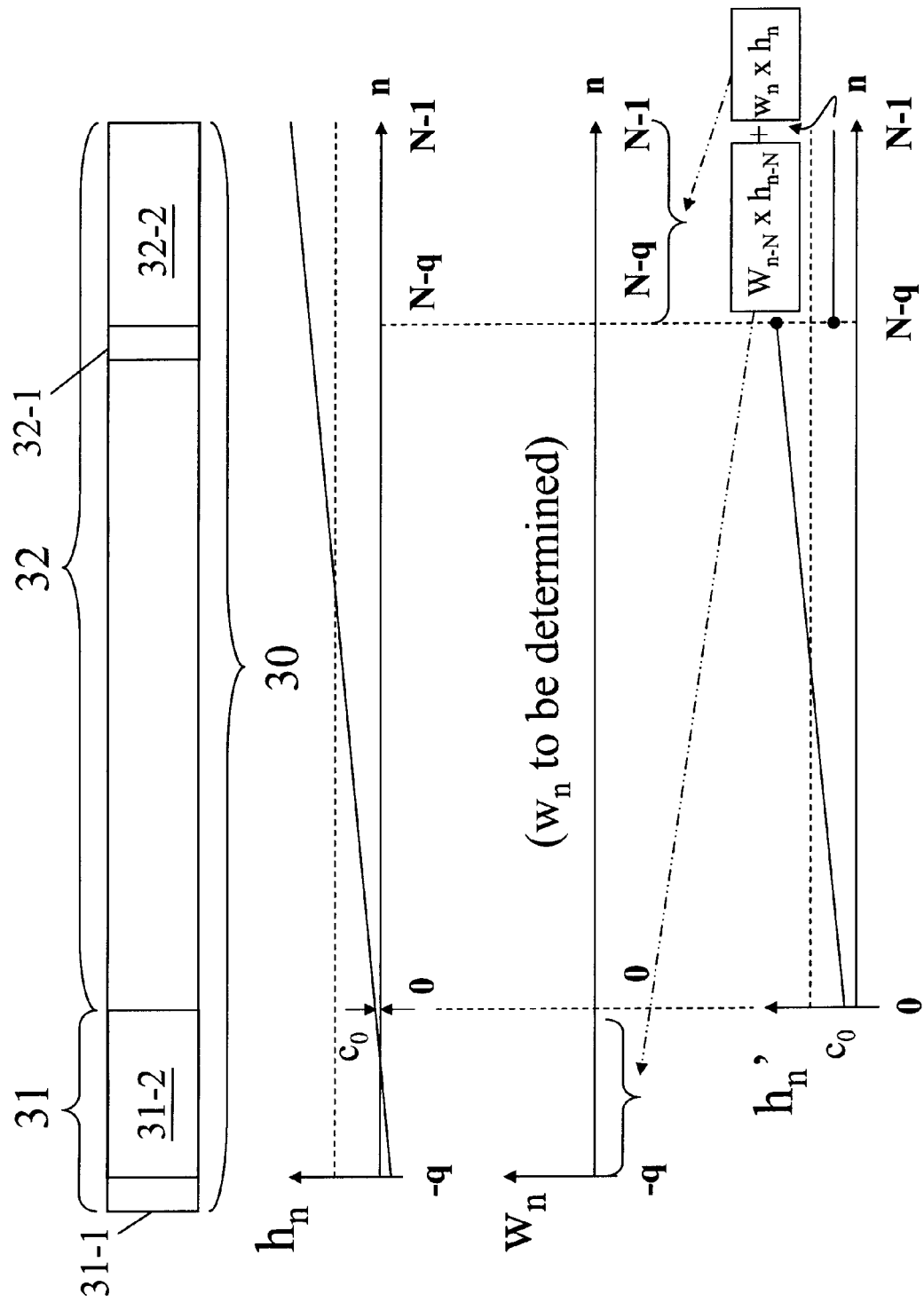
FIGS. 3A and 3B are schematic diagrams illustrating a method of determining a windowing function according to an example of the present invention.
Figure 3B:
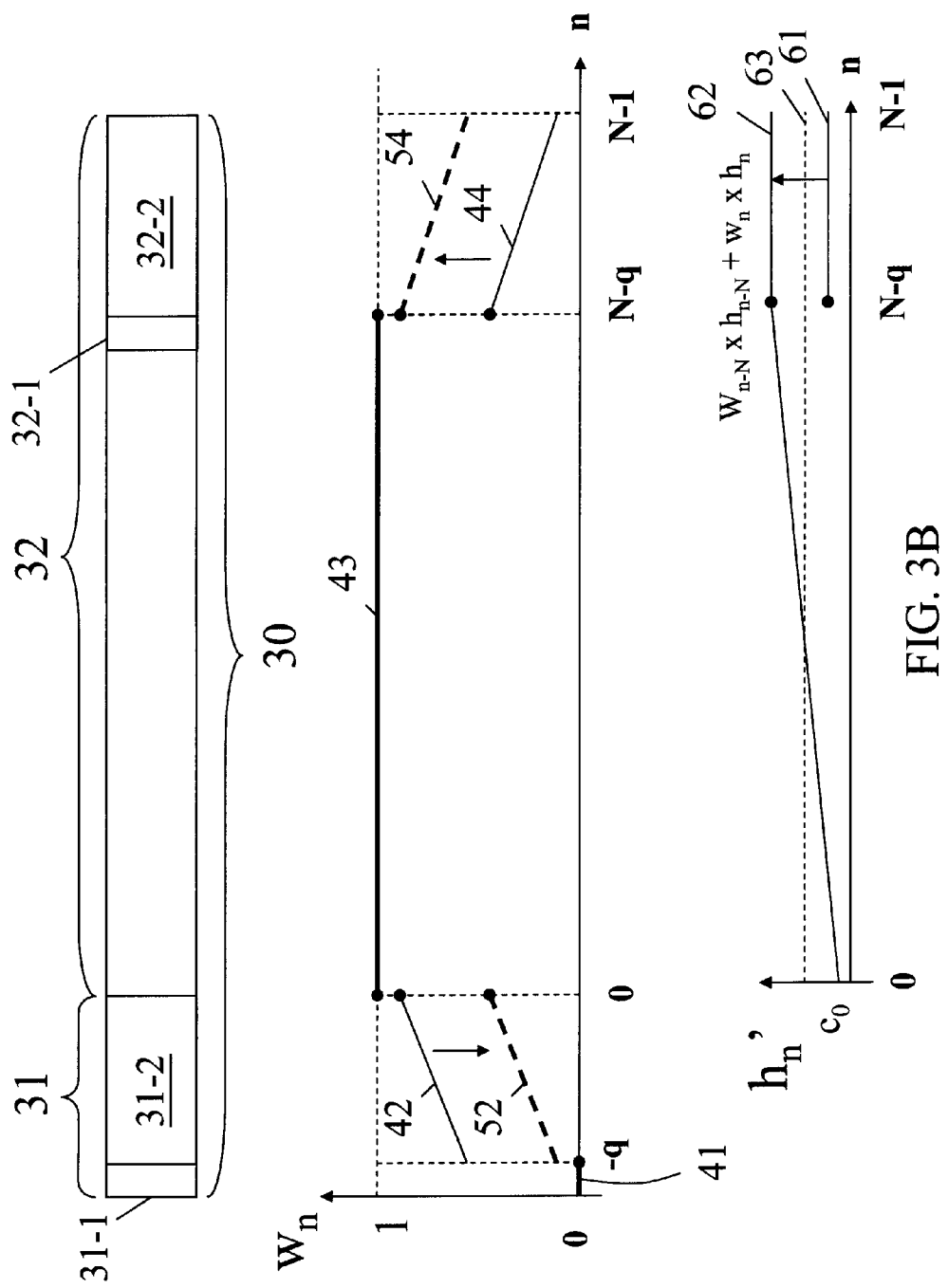

Examples of the present invention may provide a windowing function $w_n$ for use in a windowing process to reduce or eliminate the time-varying channel effect. These examples are based on a reasonable assumption that the channel may be a first-order linear time-varying channel in time domain because an OFDM receiver located at a vehicle may move as the vehicle moves at a speed within a reasonable range. Specifically, the acceleration of the vehicle may not be too large so that the speed may exceed the reasonable range in a short time, at which the channel may become non-linear. FIGS. 3A and 3B are schematic diagrams illustrating a method of determining a windowing function according to an example of the present invention. Referring to FIG. 3A, an OFDM symbol 30 to be transmitted may include a guard interval (GI) 31 and a useful symbol 32. The GI 31, often referred to as a cyclic prefix (CP), may be a duplicate of an end section (both time periods 32-1 and 32-2) of the useful symbol 32. Assuming that the GI 31 is longer in duration than a delay spread 31-1, a period of time 31-2 free from inter-symbol interference (ISI) or ISI-free region 31-2 may exist. The OFDM symbol 30 may be transmitted over a first-order time-varying linear channel, which may be expressed as $$h_n = c_0 + c_1 \cdot n$$

where $h_n$ is a first-order linear channel response, n is an index of a sample and $c_0$ and $c_1$ are coefficients based on the first-order linear channel assumption. The channel response $h_n$ as illustrated in FIG. 3A has a positive slope, i.e., $c_1 > 0$. In other examples, however, the channel response $h_n$ may have a negative slope, i.e., $c_1 < 0$. The ISI-free region 31-2 may include a number of "q" samples and the useful symbol 32 may include a number of "N" samples from sample points "0" to "N−1", q and N being natural numbers. An object of the method is to determine the window function $w_n$, based on which the channel effect, i.e., the inter-carrier interference (ICI) effect, may be alleviated. With the window function $w_n$, it may be expected to attain an equivalent channel response $h'_n$ that may be independent of time for samples between "N−q" and "N−1", resulting in an improved performance. The equivalent channel response $h'_n$ may be obtained by multiplying the original channel response $h_n$ with the windowing function $w_n$ over the time period from "−q" to "N−1". The equivalent channel response $h'_n$ may be expressed as $$h_n' = w_n \times h_n + w_{n-N} \times h_{n-N}, N-q \leq n \leq N-1$$

Note that the portion "$w_{n-N} \times h_{n-N}$" may correspond to a product over the time period from "−q" to "−1", substantially the ISI-free region 31-2, and the other portion "$w_n \times h_n$" may correspond to a product over the time period from "N−q" to "N−1", i.e., the end portion 32-2. By replacing $h_n$ with $(c_0 + c_1 \times n)$, we obtain $$h'_n = w_n \times (c_0 + c_1 \times n) + w_{n-N} \times \qquad \text{(Equation A)}$$
$$[c_0 + c_1 \times (n-N)]$$
$$= (w_n + w_{n-N}) \times c_0 + [w_n \times n +$$
$$w_{n-N} \times (n-N)] \times c_1$$

By letting $w_n + w_{n-N} = 1$, $h_n'$ may be rewritten as $$h_n' = c_0 + [w_n \times N + (n-N)] \times c_1$$

To satisfy that $h_n'$ is independent of time for samples between "N−q" and "N−1", the windowing function $w_n$ may be identified as $$w_n = (-1/N) \times n + k, \text{ k being a constant, and accordingly}$$

$$h_n' = k', \text{ k' being a constant, for } N-q \leq n \leq N-1$$

Referring to FIG. 3B, the windowing function $w_n$ may include a first linear section 41 having a weight value of zero (0), which corresponds to the delay spread 31-1, a second linear section adjustable between lines 42 and 52 for samples between "−q" and "0", which may have a positive slope, i.e., 1/N, a third linear section 43 having a weight value of one (1) for samples between "0" and "N−q", and a fourth linear section adjustable between lines 44 and 54 for samples between "N−q" and "N−1", which may have a negative slope, i.e., −1/N. The range of an adjustable region between lines 42 and 52 and between lines 44 and 54 may depend on the constant k. Furthermore, the sum of the weight value in the second linear section and that in the fourth linear section is equal to 1 in view of $w_n + w_{n-N} = 1$. That is, the adjustable region in the second linear section may change from line 42 toward line 52 as the adjustable region in the fourth linear section changes from line 44 toward line 54. Furthermore, the equivalent channel response $h_n'$ may include a linear section adjustable between lines 61 and 62 for samples between "N−q" and "N−1". The linear section may be substantially independent of time and the adjustable region between lines 61 and 62 may depend on the constant k'. In one example, the adjustable region may change from line 61 toward line 62 as the adjustable region in the fourth linear section changes from line 44 toward line 54. Moreover, by adjusting the fourth linear section between lines 44 and 54, a line 63 illustrated in dotted lines in the adjustable region in the equivalent channel response may be obtained.

A particular solution of the windowing function $w_n$ may be calculated based on the assumptions below, referring back to the above Equation A. The equivalent channel response with the line 63 illustrated in dotted lines may be adjusted to be the mean value of the first-order linear time-varying channel.

$$\begin{cases} w_n + w_{n-N} = 1 & (1) \\ w_n \cdot n + w_{n-N} \cdot (n-N) = c_0 + c_1 \dfrac{N-q-1}{2} & (2) \end{cases}$$

The equation (1) may be rewritten as $$w_{n-N} = 1 - w_n \qquad (3)$$

One may then substitute the equation (3) back into the equation (2) to obtain $$w_n = 1 - \frac{n}{N} + \frac{\dfrac{(N-q-1)}{2}}{N} \qquad (3A)$$

Let $$n' = n - \frac{N-q-1}{2},$$

therefore $$w_{n'} = 1 - \frac{n'}{N}, \quad \frac{(1-\alpha)N}{2} \leq n' < \frac{(1+\alpha)N}{2} \qquad (3B)$$

where $\alpha$ is a roll-off factor equal to $T_v/T_u$, $T_v$ is the length of the ISI-free region in time domain, and $T_u$ is the length of the useful symbol in time domain.

Finally, the windowing function $w_n$ may be expressed as $$w_{n'} = \begin{cases} 1, & 0 \leq |n'| < \dfrac{N(1-\alpha)}{2} \\ 1 - \dfrac{|n'|}{N}, & \dfrac{N(1-\alpha)}{2} \leq |n'| < \dfrac{N(1+\alpha)}{2} \\ 0, & \text{otherwise} \end{cases} \qquad (4)$$

Figure 4A:
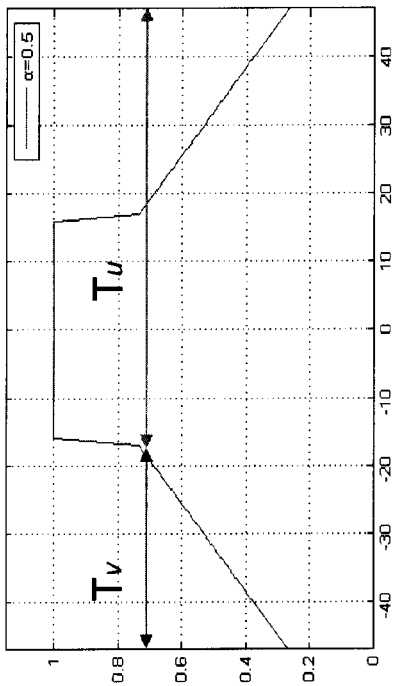
FIGS. 4A, 4B and 4C are diagrams illustrating windowing coefficients at different values of roll-off factors ($\alpha$) according to examples of the present invention.
Figure 4B:
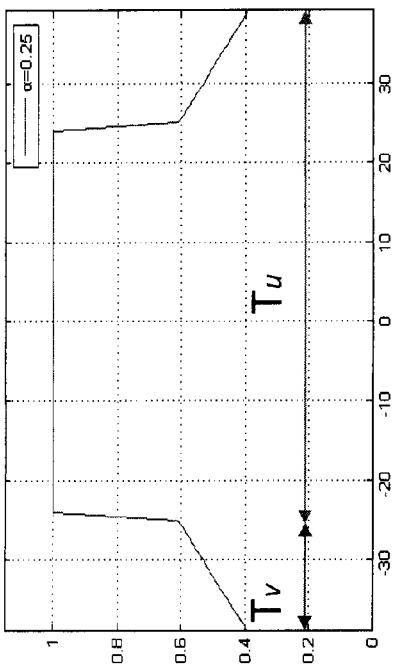
Figure 4C:
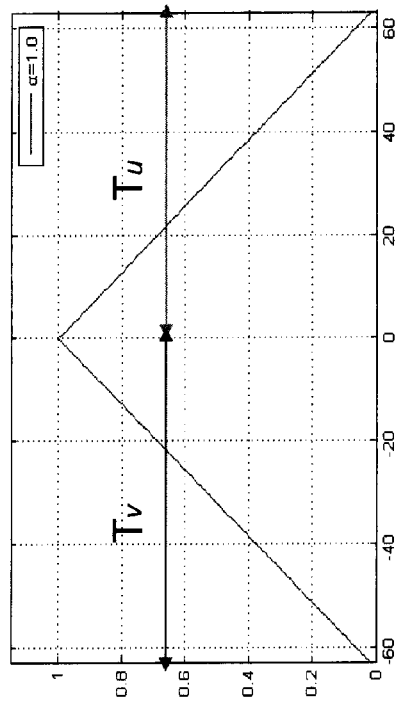

FIGS. 4A, 4B and 4C are diagrams illustrating windowing functions versus the shift sample index n' at different values of roll-off factors ($\alpha$) according to examples of the present invention. Specifically, FIG. 4A is a diagram illustrating the windowing function with a equal to ¼, FIG. 4B is a diagram illustrating the windowing function with a equal to ½ and FIG. 4C is a diagram illustrating the windowing function with a equal to 1. Referring to FIGS. 4A, 4B and 4C, as α increases, $T_v$ may rise up and become closer to $T_u$. When α is equal to 1, $T_v=T_u$, which means that the length of the ISI-free region is equal to the length of the useful symbol. Referring to FIG. 4C, the curve of the windowing function is symmetric over the horizontal axis with respect to a sample point "0" thereon.

Figure 5A:
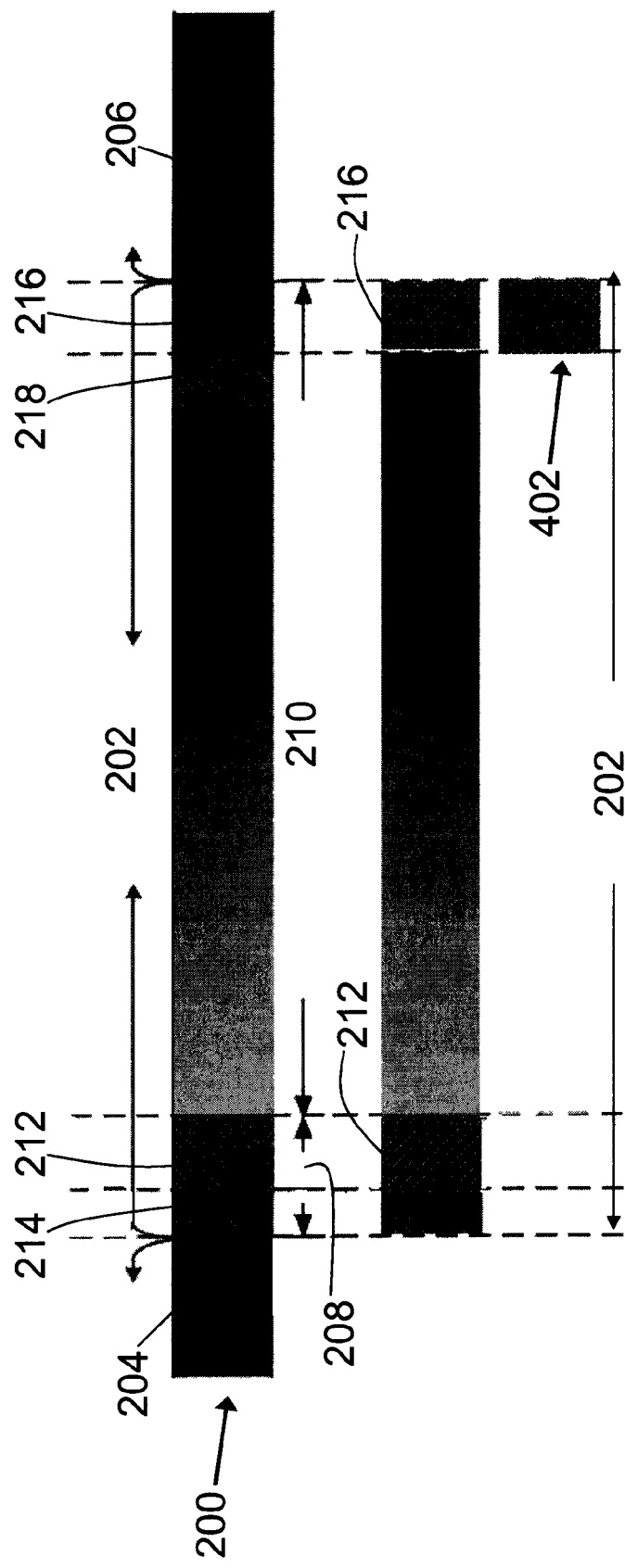
FIGS. 5A and 5B are diagrams illustrating a method of applying a cyclic shift-and-sum operation to an ISI-free region of an OFDM symbol according to an example of the present invention.
Figure 5B:
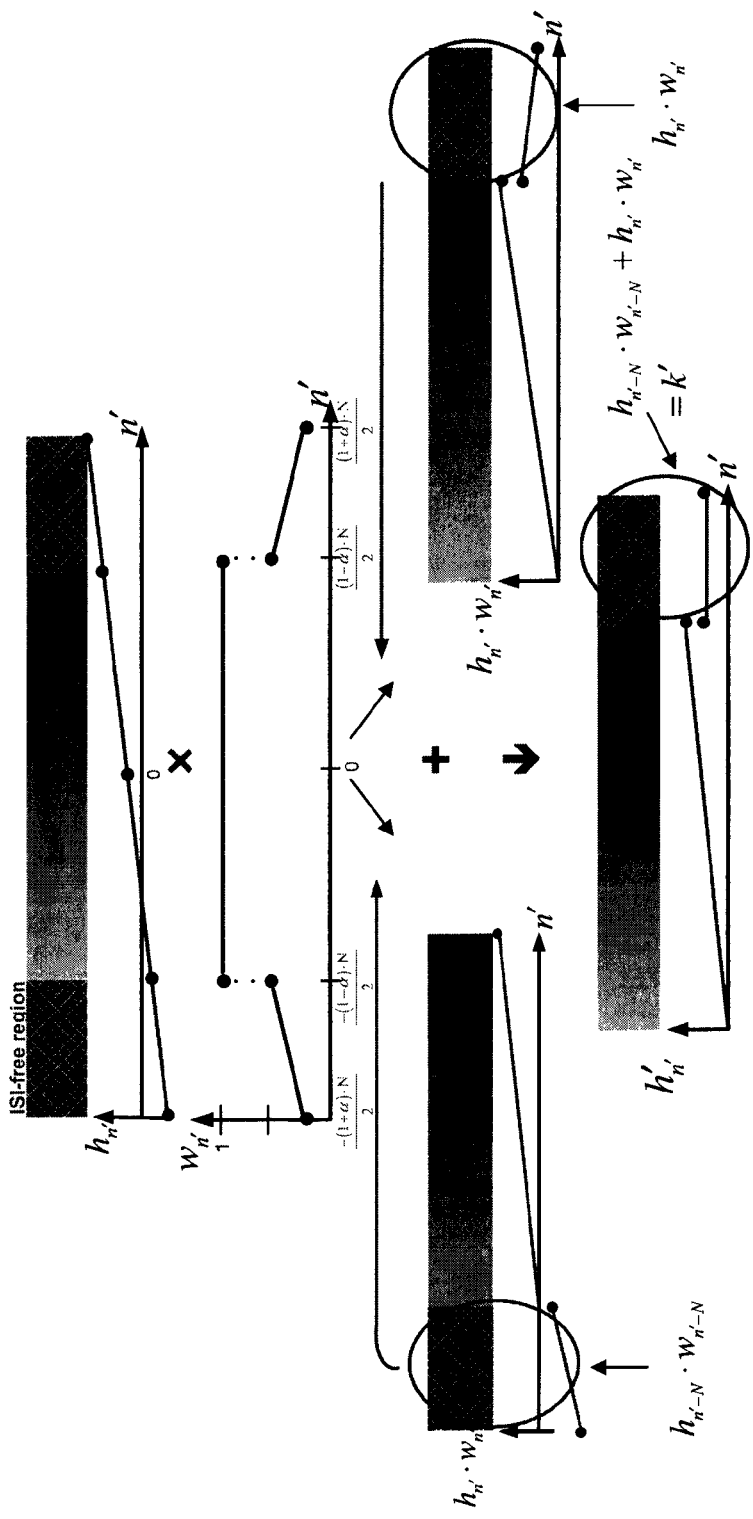

FIGS. 5A and 5B are diagrams illustrating a method of applying a cyclic shift-and-sum operation to an ISI-free region 212 of an OFDM symbol 202 according to an example of the present invention. Referring to FIG. 5A, an OFDM sequence 200 may include OFDM symbols 202, 204 and 206. The OFDM symbol 202 may include a guard interval 208 with $N_g$ samples and a useful symbol 210 with N samples. The guard interval 208 may include the ISI-free region 212 and a delay spread region 214. The ISI-free region 212 may be shifted, for example, by a delay operation, so as to be aligned with an end portion 216 of the useful symbol 210 in time domain. The shifted ISI-free region 402 shown in FIG. 5A may then be summed with the end portion 216 of the useful symbol 210 for reducing or eliminating the ICI effect caused by the first-order linear time-varying channel. Referring to FIG. 5B, the shift-and-sum operation may be similar to the calculation of the channel response $h_n'(=w_n \times h_n + w_{n-N} \times h_{n-N})$ described and illustrated with reference to FIG. 3A.

Figures 6A, 6B, 6C:
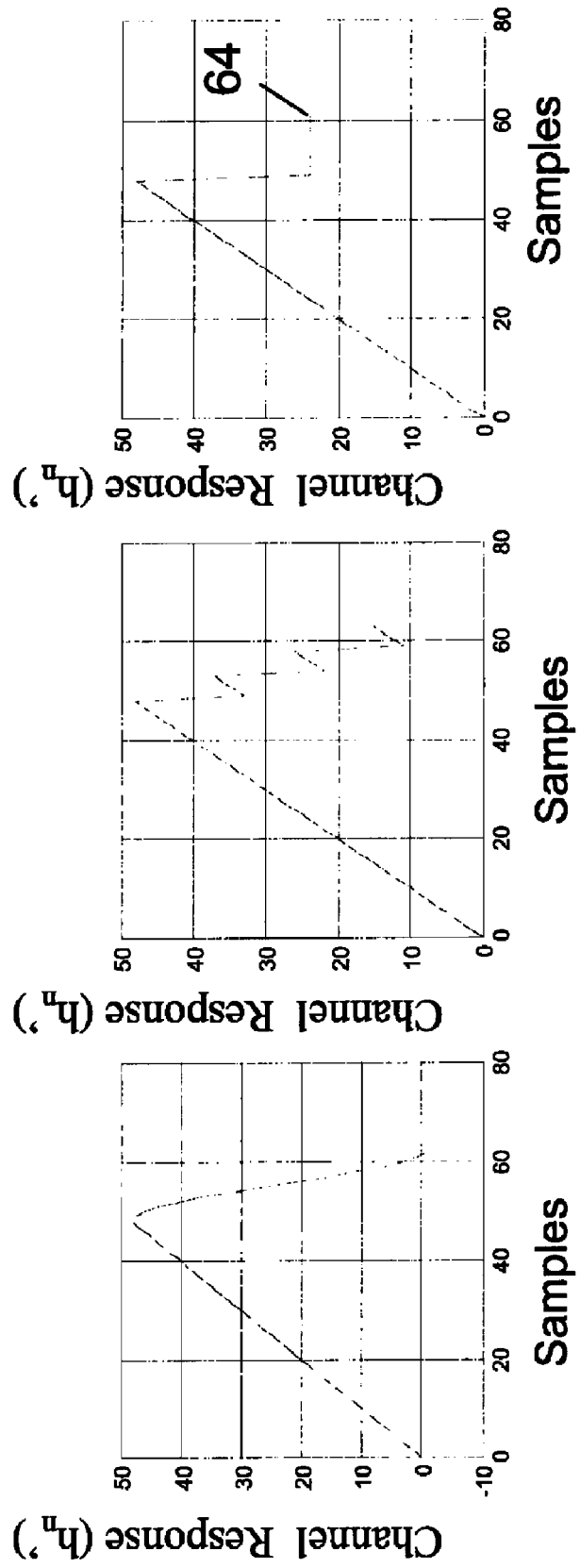
FIGS. 6A, 6B and 6C are exemplary simulation results of the equivalent channel response $h'_n$ after a cyclic shift-and-sum operation for prior art techniques and a method according to the present invention.

FIGS. 6A, 6B and 6C are exemplary simulation results of the equivalent channel response $h'_n$ for prior art techniques and a method according to the present invention. The simulation may be conducted on the basis of a first-order time-varying channel with a roll-off factor (α) of 0.25. FIGS. 6A and 6B are related to methods disclosed in the above-mentioned Castelain and Wilhelmsson techniques, respectively. Referring to FIGS. 6A and 6B, neither Castelain nor Wilhelmsson may achieve a channel response $h_n'$ that has a region independent of time. Referring to FIG. 6C, however, the channel responses $h_n'$ includes a region 64, which may be independent of time for samples between forty-eight (48) and sixty-three (63).

Figure 7:
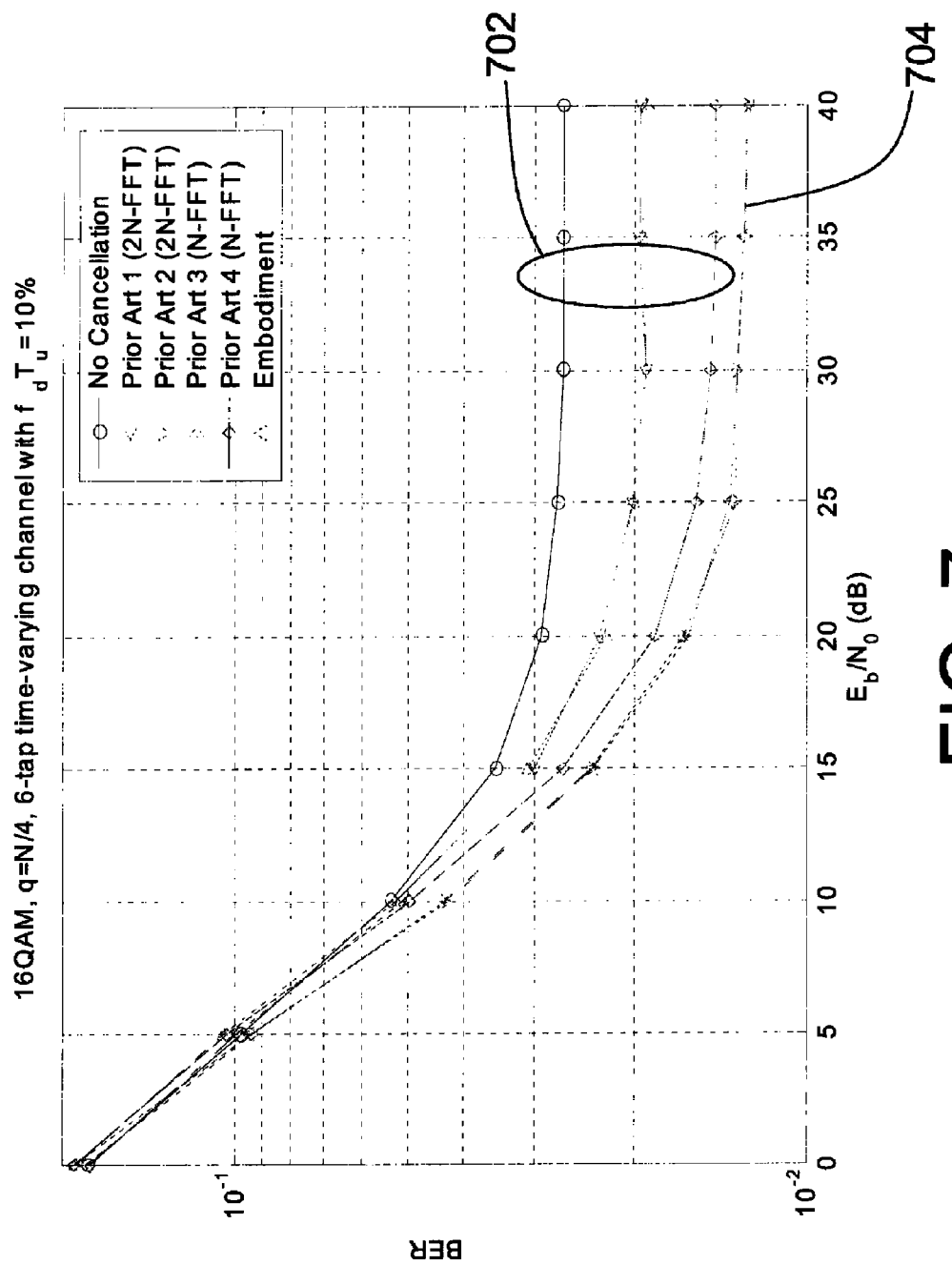
FIG. 7 is a plot illustrating a comparison in simulation results among prior art techniques and a method according to the present invention.

FIG. 7 is a plot illustrating a comparison in exemplary simulation results among prior art techniques and a method according to the present invention. Referring to FIG. 7, according to the simulation result, a method of the present invention represented by a curve 704 may provide an OFDM receiver with better signal-to-noise ratio ($E_b/N_o$) or lower bit-error rate BER than at least the above-mentioned Muschallik, Castelain and Wilhelmsson methods, represented by a curve 702.

Figure 8:
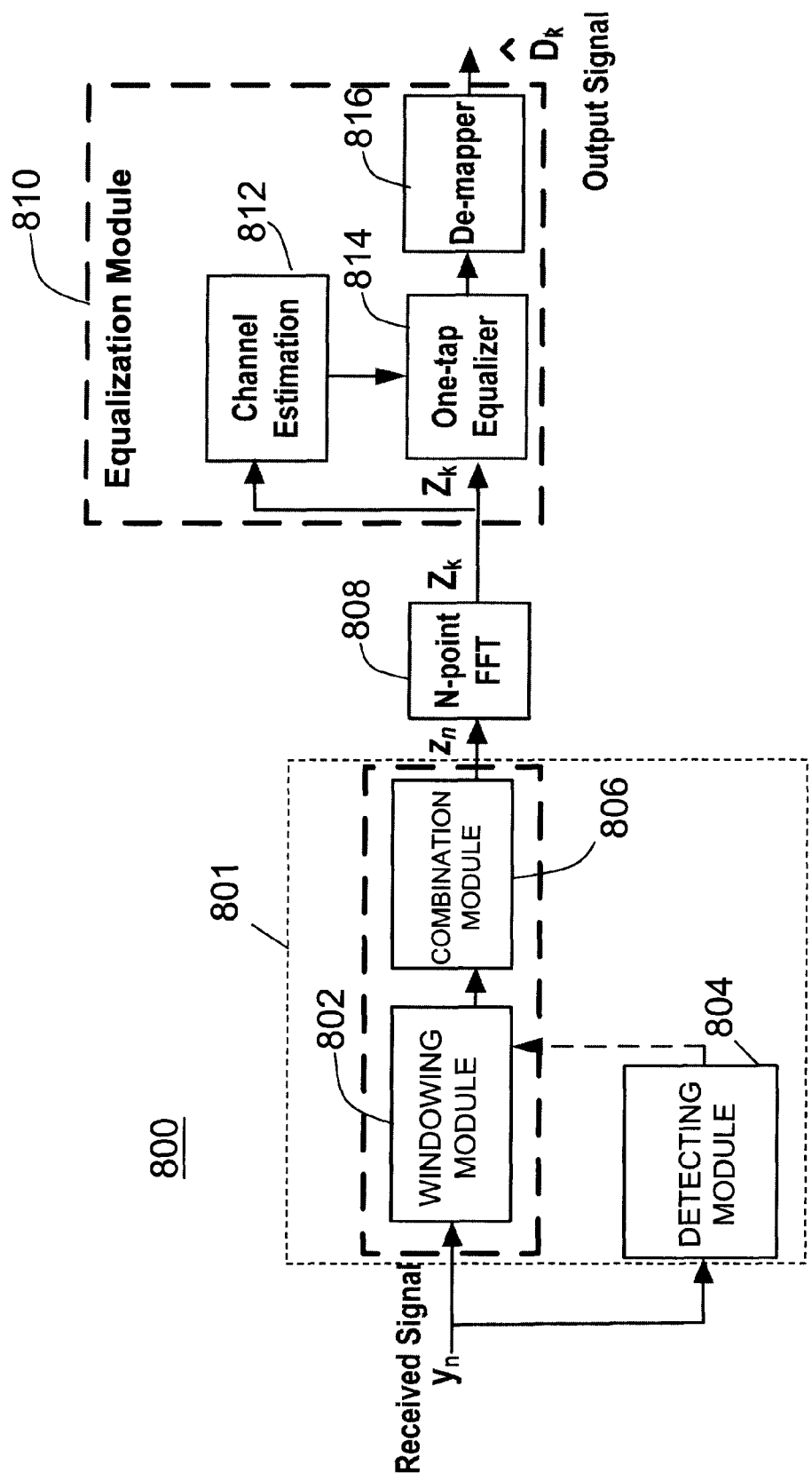
FIG. 8 is a system block diagram illustrating a receiver of an OFDM system according to an example of the present invention.

FIG. 8 is a system block diagram illustrating a receiver 800 of an OFDM system according to an example of the present invention. Referring to FIG. 8, the receiver 800 may include an ICI cancellation apparatus 801, an N-point FFT module 808 and an equalization module 810. The ICI cancellation apparatus 801 may include a detecting module 804, a windowing module 802 and a combination module 806. Moreover, the equalization module 810 may include a channel estimation module 812, a one-tap equalizer 814 and a de-mapper 816. The detecting module 804 may be capable of detecting the ISI-free region 212 in the guard interval 208. Method of and apparatus for identifying the length of an ISI-free region may be found in, for example, U.S. Patent Application Publication No. 20050105659A1 by Chorng-Ren Sheu et al., one of the inventors of the present invention, entitled "Method and Apparatus for Synchronization of the OFDM Systems," which is incorporated herein by reference.

The windowing module 802 may be capable of providing a windowing function in time domain, identifying a weight value in the windowing function based on the length of the ISI-free region 212, and multiplying a channel response related to the OFDM symbol 202 by the windowing function in time domain to form a windowing result. The windowing result may comprise a first portion corresponding to the ISI-free region 212 and a second portion corresponding to an end portion 216 of the useful symbol 210. The combination module 806 may be capable of combining the first portion and the second portion of the windowing result to form a ICI-cancellation result $z_n$ having less inter-carrier interference than the original OFDM symbol 202. Thereafter, the ICI-cancellation result $z_n$ may be fed into the N-point FFT module 808, which performs an N-point FFT so as to form an FFT result $Z_k$. The FFT result $Z_k$ may be subsequently sent to the equalization module 810 to cancel the channel effect. By using the channel estimation module 812 to reconstruct the channel frequency response and the one-tap equalizer 814 to subtract the channel effect after equalizing the FFT result $Z_k$. Consequently, by using the de-mapper 816, an output signal $D_k$ of the OFDM system may be obtained.

It will be appreciated by those skilled in the art that changes could be made to the examples described above without departing from the broad inventive concept thereof. For instance, although the above-mentioned examples are described and illustrated on the basis of an OFDM system, skilled persons in the art will understand that the present invention may be applicable to other communication systems to alleviate the channel effect. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. An apparatus capable of inter-carrier interference (ICI) cancellation in a communication system, the apparatus comprising:

a detecting module configured to detect an ISI-free region free from inter-symbol interference (ISI) in a guard interval (GI) of a symbol in time domain;

a windowing module configured to provide a windowing function in time domain, identifying a weight value in the windowing function based on the ISI-free region, and multiplying a channel response related to the symbol by the windowing function in time domain to obtain a windowing result, wherein the windowing result comprises a first portion corresponding to the ISI-free region and a second region corresponding to an end portion of the symbol, the end portion and the ISI-free region having the same length; and a combination module configured to combine the first portion and the second portion of the windowing result in time domain.

2. The apparatus of claim 1, wherein the windowing function includes a first linear section corresponding to a delay spread of the GI of the symbol.

3. The apparatus of claim 2, wherein a weight value of the first linear section of the windowing function is zero (0).

4. The apparatus of claim 1, wherein the windowing function includes a second linear section corresponding to the ISI-free region of the GI of the symbol.

5. The apparatus of claim 4, wherein the windowing function includes a third linear section corresponding to the symbol except the GI and the end portion.

6. The apparatus of claim 5, wherein a weight value of the third linear section is one (1).

7. The apparatus of claim 5, wherein the windowing function includes a fourth linear section corresponding to the end portion of the symbol.

8. The apparatus of claim 7, wherein the sum of a weight value of the second linear section and a weight value of the fourth linear section of the windowing function is one (1).

9. The apparatus of claim 1, wherein the combination module sums the first portion of the windowing result into the second portion of the windowing result.

10. The apparatus of claim 9, wherein the sum of the first portion and the second portion of the windowing result is independent of time.

11. The apparatus of claim 1, wherein the communication system includes an orthogonal frequency division multiplexing (OFDM) system.

12. An apparatus capable of inter-carrier interference (ICI) cancellation in a communication system, the apparatus comprising:
a detecting module configured to detect an ISI-free region free from inter-symbol interference (ISI) in a guard interval (GI) of a symbol in time domain, the symbol including an end portion having the same length as the ISI-free region;
a windowing module configured to provide a windowing function in time domain, and multiplying a channel response related to the symbol by the windowing function in time domain to obtain a windowing result, wherein the windowing function includes a first linear section corresponding to the ISI-free region, a second linear region corresponding to the symbol except the GI and the end portion, and a third linear section corresponding to the end portion, and wherein the slope of the first linear section has an opposite sign number to the slope of the third linear section; and
a combination module configured to sum a first portion of the windowing result into a second portion of the windowing result in time domain, wherein the first portion corresponds to the ISI-free region and the second region corresponds to the end portion of the symbol.

13. The apparatus of claim 12, wherein the windowing function includes a fourth linear section corresponding to a delay spread of the GI of the symbol.

14. The apparatus of claim 12, wherein the windowing module identifies a weight value for each of the first, second and third linear sections of the windowing function.

15. The apparatus of claim 14, wherein the sum of a weight value of the first linear section and a weight value of the third linear section of the windowing function is one (1).

16. The apparatus of claim 12, wherein the sum of the first portion and the second portion of the windowing result is independent of time.

17. A method of cancelling inter-carrier interference (ICI) of a symbol, the method comprising:
detecting an ISI-free region free from inter-symbol interference (ISI) in a guard interval (GI) of the symbol in time domain, the symbol including an end portion having the same length as the ISI-free region;
providing a windowing function in time domain;
identifying a weight value in the windowing function based on the ISI-free region;
multiplying a channel response related to the symbol by the windowing function in time domain to obtain a windowing result, wherein the windowing result comprises a first portion corresponding to the ISI-free region and a second region corresponding to the end portion of the symbol; and
combining the first portion and the second portion of the windowing result in time domain.

18. The method of claim 17, wherein the windowing function includes a first linear section corresponding to a delay spread of the GI of the symbol.

19. The method of claim 18 further comprising assigning a weight value of zero (0) to the first linear section of the windowing function.

20. The method of claim 17, wherein the windowing function includes a second linear section corresponding to the ISI-free region of the GI of the symbol.

21. The method of claim 20, wherein the windowing function includes a third linear section corresponding to the symbol except the GI and the end portion.

22. The method of claim 21 further comprising assigning a weight value of one (1) to the third linear section is one (1).

23. The method of claim 20, wherein the windowing function includes a fourth linear section corresponding to the end portion of the symbol.

24. The method of claim 23, wherein the sum of a weight value of the second linear section and a weight value of the fourth linear section of the windowing function is one (1).

25. The method of claim 17, wherein combining the first portion and the second portion of the windowing result in time domain includes summing the first portion of the windowing result into the second portion of the windowing result.

26. The method of claim 25, wherein the sum of the first portion and the second portion of the windowing result is independent of time.

* * * * *